United States Patent
Lin

(10) Patent No.: US 9,906,489 B2
(45) Date of Patent: Feb. 27, 2018

(54) METHOD, SYSTEM AND DEVICE FOR IMPLEMENTING INTERCONNECTION BETWEEN IP DOMAINS

(71) Applicant: Huawei Technologies Co., Ltd., Shenzhen (CN)

(72) Inventor: Yangbo Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/354,628

(22) Filed: Nov. 17, 2016

(65) Prior Publication Data

US 2017/0070477 A1   Mar. 9, 2017

Related U.S. Application Data

(63) Continuation of application No. 11/579,977, filed as application No. PCT/CN2006/000863 on Apr. 29, 2006, now Pat. No. 9,525,583.

(30) Foreign Application Priority Data

Apr. 29, 2005 (CN) .......................... 2005 1 0069415

(51) Int. Cl.
*H04L 12/66* (2006.01)
*H04M 3/42* (2006.01)
(Continued)

(52) U.S. Cl.
CPC .... *H04L 61/2528* (2013.01); *H04L 29/06027* (2013.01); *H04L 29/12009* (2013.01);
(Continued)

(58) Field of Classification Search
CPC .......... H04L 29/06027; H04L 65/1043; H04L 65/104; H04L 65/1026; H04L 65/103; H04L 65/1006
(Continued)

(56) References Cited

U.S. PATENT DOCUMENTS 6,680,952 B1 * 1/2004 Berg .................... H04L 12/6418 370/401
6,799,210 B1 * 9/2004 Gentry .................... H04L 29/06 370/352
(Continued)

FOREIGN PATENT DOCUMENTS

CN    1567775 A    1/2005
EP    1341360 A1   9/2003
(Continued)

OTHER PUBLICATIONS

Machine Translation and Abstract of Chinese Publication No. CN1567775, Jan. 19, 2005, 6 pages.
(Continued)

*Primary Examiner* — Wutchung Chu
(74) *Attorney, Agent, or Firm* — Conley Rose, P.C.

(57) ABSTRACT

A method, a system and a device for implementing interconnection between IP domains. The method mainly includes: first, the Media Gateway Controller (MGC) sends the IP domain information of the IP domain to which the media stream to be created pertains to the Media Gateway (MG) between IP domains; when the MG receives the IP domain information for creating the media stream from the MGC, the MG creates the corresponding media stream between the IP domains according to the IP domain information, thus implementing the interconnection between the IP domains.

10 Claims, 2 Drawing Sheets

(51) Int. Cl.
*H04L 29/12* (2006.01)
*H04L 29/06* (2006.01)

(52) U.S. Cl.
CPC .... *H04L 29/12405* (2013.01); *H04L 65/1026* (2013.01); *H04L 65/1036* (2013.01); *H04L 65/1043* (2013.01)

(58) Field of Classification Search
USPC ................................. 370/352, 356, 401, 400
See application file for complete search history.

(56) References Cited

U.S. PATENT DOCUMENTS

| | | | |
|---|---|---|---|
| 6,850,763 B1* | 2/2005 | Naqvi | H04W 92/14 370/237 |
| 6,944,166 B1* | 9/2005 | Perinpanathan | H04L 47/10 370/352 |
| 7,359,320 B2 | 4/2008 | Klaghofer et al. | |
| 7,447,192 B1* | 11/2008 | Lehto | H04L 29/06027 370/352 |
| 7,565,448 B1* | 7/2009 | Schlesener | H04L 45/00 709/242 |
| 7,634,577 B1* | 12/2009 | Grabelsky | H04L 29/06027 370/356 |
| 7,933,279 B1* | 4/2011 | Bradd | H04M 7/1245 370/351 |
| 2002/0078202 A1* | 6/2002 | Ando | H04L 63/0236 709/225 |
| 2002/0186723 A1* | 12/2002 | Sprague | H04J 3/125 370/523 |
| 2003/0012207 A1* | 1/2003 | Klaghofer | H04M 7/006 370/401 |
| 2003/0027595 A1* | 2/2003 | Ejzak | H04L 51/38 455/560 |
| 2003/0076815 A1* | 4/2003 | Miller | H04L 49/602 370/352 |
| 2003/0099192 A1* | 5/2003 | Scott | H04L 45/10 370/229 |
| 2003/0149789 A1* | 8/2003 | Hoffmann | H04L 29/12009 709/245 |
| 2003/0161336 A1* | 8/2003 | Preguica | H04L 45/04 370/401 |
| 2003/0169751 A1* | 9/2003 | Pulkka | H04L 29/06027 370/401 |
| 2003/0202521 A1* | 10/2003 | Havinis | H04Q 3/0025 370/401 |
| 2004/0042409 A1* | 3/2004 | Hoffmann | H04Q 3/0025 370/252 |
| 2004/0151194 A1* | 8/2004 | Cannon | H04Q 3/0025 370/401 |
| 2004/0190498 A1* | 9/2004 | Kallio | H04M 7/128 370/352 |
| 2004/0258045 A1* | 12/2004 | Groves | H04L 29/06027 370/352 |
| 2006/0053197 A1* | 3/2006 | Yoshimura | H04L 51/38 709/206 |
| 2006/0067298 A1* | 3/2006 | Houck | H04L 47/825 370/352 |
| 2006/0153205 A1* | 7/2006 | Belling | H04M 7/00 370/401 |
| 2006/0203803 A1* | 9/2006 | Perry | H04L 29/06027 370/352 |

FOREIGN PATENT DOCUMENTS

| | | |
|---|---|---|
| EP | 1622412 A1 | 1/2006 |
| JP | 2003506929 A | 2/2003 |
| JP | 2003283675 A | 10/2003 |
| JP | 2004088532 A | 3/2004 |
| JP | 2004166143 A | 6/2004 |
| JP | 2004518388 A | 6/2004 |
| JP | 2004336329 A | 11/2004 |
| WO | 0193606 A1 | 12/2001 |
| WO | 0209387 A1 | 1/2002 |
| WO | 0217038 A2 | 2/2002 |
| WO | 03084203 A1 | 10/2003 |
| WO | 2004025925 A1 | 3/2004 |

OTHER PUBLICATIONS

Machine Translation and Abstract of Japanese Publication No. JP2003283675, Oct. 3, 2003, 40 pages.
Machine Translation and Abstract of Japanese Publication No. JP2003506929, Feb. 18, 2003, 8 pages.
Machine Translation and Abstract of Japanese Publication No. JP2004088532, Mar. 18, 2004, 25 pages.
Machine Translation and Abstract of Japanese Publication No. JP2004166143, Jun. 10, 2004, 16 pages.
Machine Translation and Abstract of Japanese Publication No. JP2004336329, Nov. 25, 2004, 18 pages.
Machine Translation and Abstract of Japanese Publication No. JP2004518388, Jun. 17, 2004, 8 pages.
"Series H: Audiovisual and Multimedia Systems, Infrastructure of audiovisual services—Communication procedures, Implementors' Guide for the H.248 Sub-series of Recommendations ("Media Gateway Control Protocol")," ITU-T, H.248 Sub-series Implementors' Guide, Nov. 26, 2004, 18 pages.
McDysan, D., et al., "Overview of Multiservice Switching Forum (MSF) Technical Activities and Direction," Feb. 21, 2001, 25 pages.
"Series H: Audiovisual and Multimedia Systems, Infrastructure of audiovisual services—Communication procedures, Gateway control protocol: The use of local and remote descriptors with H.221 and H.223 multiplexing," ITU-T, H.248.20, XP002739900, Nov. 2002, 12 pages.
"Series H: Audiovisual and Multimedia Systems, Infrastructure of audiovisual services—Communication procedures, Gateway control protocol: Version 2, Corrigendum 1," ITU-T, H.248.1 v2, Corrigendum 1, Mar. 2004, 44 pages.
Foreign Communication From a Counterpart Application, PCT Application No. PCT/CN2006/000863, English Translation of International Search Report dated Aug. 17, 2006, 2 pages.
Foreign Communication From a Counterpart Application, PCT Application No. PCT/CN2006/000863, English Translation of Written Opinion dated Aug. 17, 2006, 4 pages.
Foreign Communication From a Counterpart Application, Korean Application No. 10-2006-7026301, Korean Office Action dated Feb. 20, 2008, 5 pages.
Foreign Communication From a Counterpart Application, Korean Application No. 10-2006-7026301, English Translation of Korean Office Action dated Feb. 20, 2008, 2 pages.
Foreign Communication From a Counterpart Application, Canadian Application No. 2570188, Canadian Office Action dated Mar. 4, 2009, 4 pages.
Foreign Communication From a Counterpart Application, Chinese Application No. 200510069415.5, Chinese Office Action dated Jun. 1, 2007, 3 pages.
Foreign Communication From a Counterpart Application, Chinese Application No. 200510069415.5, English Translation of Chinese Office Action dated Jun. 1, 2007, 2 pages.
Foreign Communication From a Counterpart Application, Australian Application No. 2006243577, Australian Office Action dated Jun. 25, 2006, 3 pages.
Foreign Communication From a Counterpart Application, Chinese Application No. 200710153078.7, Chinese Office Action dated Aug. 7, 2009, 5 pages.
Foreign Communication From a Counterpart Application, Chinese Application No. 200710153078.7, English Translation of Chinese Office Action dated Aug. 7, 2009, 4 pages.
Foreign Communication From a Counterpart Application, Japanese Application No. 2012-005959, Japanese Office Action dated Aug. 13, 2013, 2 pages.
Foreign Communication From a Counterpart Application, Japanese Application No. 2012-005959, English Translation of Japanese Office Action dated Aug. 13, 2013, 2 pages.

(56) References Cited

OTHER PUBLICATIONS

Foreign Communication From a Counterpart Application, Japanese Application No. 2010-16124, Japanese Office Action dated Sep. 20, 2011, 3 pages.
Foreign Communication From a Counterpart Application, Japanese Application No. 2010-16124, English Translation of Japanese Office Action dated Sep. 20, 2011, 4 pages.
Foreign Communication From a Counterpart Application, Canadian Application No. 2570188, Canadian Office Action dated Sep. 23, 2014, 2 pages.
Foreign Communication From a Counterpart Application, Korean Application No. 2008-010981238, Korean Notice of Rejection dated Dec. 9, 2008, 4 pages.
Foreign Communication From a Counterpart Application, Korean Application No. 2008-010981238, English Translation of Korean Notice of Rejection dated Dec. 9, 2008, 2 pages.
Foreign Communication From a Counterpart Application, European Application No. 15160480.8, Extended European Search Report dated Jun. 8, 2015, 8 pages.

\* cited by examiner

METHOD, SYSTEM AND DEVICE FOR IMPLEMENTING INTERCONNECTION BETWEEN IP DOMAINS

CROSS-REFERENCE TO RELATED APPLICATIONS

This application is a continuation of U.S. patent application Ser. No. 11/579,977, filed on Aug. 24, 2007, which is a National Stage of International Application No. PCT/CN2006/000863, filed on Apr. 29, 2006, which claims priority to Chinese Patent Application No. 200510069415.5, filed on Apr. 29, 2005. All of the afore-mentioned patent applications are hereby incorporated by reference in their entireties.

FIELD OF THE DISCLOSURE

The present disclosure relates to the field of network communication technology in general, and more specifically to a method, a system and a device for implementing interconnection between IP domains.

BACKGROUND OF THE DISCLOSURE

A network structure of Next Generation Network (NGN) is shown in FIG. 1, in which Media Gateway Controller (MGC) 110 and Media Gateways (MGs) 121, 122 are two key components in NGN. MGC provides the function of call control and MG provides the function of service bearing, thus the separation of Call Control Plan and Service Bearing Plan can be realized, network resources can be shared to full advantage, upgrading of devices and extending of service can be simplified, and the cost of development and maintenance can be reduced greatly.

Media gateway control protocols are primary communication protocols between MG and MGC, and at present, two media gateway control protocols widely used are H.248/MeGaCo (Gateway Control Protocol) and Media Gateway Control Protocol (MGCP). MGCP is drafted in October, 1999 and revised in January, 2003 by Internet Engineering Task Force (IETF), and H.248/MeGaCo is drafted in November, 2000 and revised in June, 2003 by IETF and International Telecommunication Union (ITU) jointly.

Take H.248 for example, all kinds of resources on MG are abstractly expressed as Terminations. Terminations can be divided into physical Terminations and ephemeral Terminations; the former represents physical entities with a half-permanent existence, such as a Time Division Multiplex (TDM) channel, while the latter represents common resources applied for use ephemerally and released after the duration of their use, such as Real-time Transport Protocol (RTP) streams. The association between Terminations is abstractly expressed as Context. The Context can involve a plurality of Terminations; therefore the Context describes the relationship between the Terminations in Topology.

Based on the abstract model of the protocol, connection of calls is actually manipulating of Terminations and Contexts. The manipulating is implemented through request and response of Commands between MGC and MG. The parameters carried by a Command are also called Descriptors, which are divided into several classes such as Property, Signal, Event, and Statistic Descriptors etc. The parameters with service correlation are logically converged into a Package.

The topological structure of Context defined by H.248 is not sensitive to the type of Termination itself, i.e. the Terminations composing a Context can be any physical Terminations (such as TDM channels) or ephemeral Terminations (such as RTP streams). With respect to a bidirectional media stream, common IP telephone service can be carried by interconnecting a TDM physical Termination and a RTP ephemeral Termination, local TDM telephone service can be carried by interconnecting two TDM physical Terminations, and IP-IP interconnection service can be carried by interconnecting two RTP ephemeral Terminations.

The original model of H.248 protocol is designed for MGC-MG control association inside a single IP domain. In general, a media stream is transferred between a TDM physical Termination and a RTP ephemeral Termination on common MGs. But in practical applications, besides the interconnecting of MGs under the control of MGC within respective IP domains, operators possibly need to realize interconnection between different IP domains with each other.

However, RTP streams over different IP domains need to be connected in series in the same Context to realize interconnection between IP domains; for this purpose, an MG creating a RTP stream needs to learn the information of the corresponding IP domain, so as to determine the direction of the media stream. This is to say, if the MG can not obtain the corresponding IP domain information, the RTP stream can not be created at all. At present, not any technological method can make an MG which is required to implement interconnection obtain IP domain information for creating RTP streams, i.e. at present, IP domain information for creating RTP streams can not be obtained on MG.

SUMMARY OF THE DISCLOSURE

The present disclosure aims to provide a method, a system and a device for implementing interconnection between IP domains, thus to realize the interconnection between IP domains in networks based on Media Gateway Control Protocol.

For implementing interconnection between IP domains by the present disclosure, the solutions are provided as follows.

In one respect of the present disclosure, there provides a method for implementing interconnection between IP domains, including:

A. a MG between the IP domains obtains IP domain information for creating a media stream by means of a message from a MGC;

B. the MG between the IP domains creates the corresponding media stream between the IP domains according to the IP domain information.

Optionally, the Step A includes:

A1. the MGC sends the IP domain information of the IP domain to which the media stream to be created by the MG pertains to the MG, and the MG obtains the IP domain information.

Optionally, in the Step A1, the MGC sending the IP domain information of the IP domain to which the media stream to be created by the MG pertains to the MG includes bearing the IP domain information in LocalControl Descriptor information and sending the LocalControl Descriptor information to the MG.

Optionally, in the Step A1, bearing the IP domain information in the LocalControl Descriptor includes bearing the IP domain information in extended Property of the LocalControl Descriptor; and the extended Property is defined in the LocalControl Descriptor directly or through the extended Package and Properties contained in the extended Package.

Optionally, the method further includes:
configuring a default value of the IP domain information on the MG.

Optionally, the Step A includes:
the IP domain information is in default when the MGC indicates the MG to create the media stream;
determining, by the MG, the IP domain information for creating the media stream according to the IP domain information corresponding to the default value configured in advance.

Optionally, the IP domain information is character string valued.

Optionally, in NGN the values of the IP domain information corresponding to the IP domains, which may interconnect with each other, are different from each other.

Optionally, the method further includes: in the Step A, when the IP domain information obtained from the MGC can not be identified by the MG, failing to create the media stream and returning error information to the MGC by the MG; and the Step B is not carried out.

Optionally, the error information is an error code.

In another aspect of the present disclosure, there provides a system for implementing interconnection between IP domains, including MGs between the IP domains and respective MGCs in the IP domains; each of the MGs and its MGC is configured with the IP domain information of adjacent IP domains that the MG relates to;
the MGCs each is used to send IP domain information of the IP domain to which a media stream to be created pertains to its MG when the media stream need to be created; and
the MGs each is used to create the corresponding media stream between the IP domains according to the IP domain information.

Optionally, any one of the MGCs sending the IP information required by its MG for creating the media stream includes bearing the IP domain information in LocalControl Descriptor information and sending the LocalControl Descriptor information to its MG.

Optionally, each of the MGs is configured with a default value of the IP domain information; in case that the IP domain information is in default when any one of the MGCs indicates its MG to create the media stream, determining, by the MG, the IP domain information for creating the media stream according to the IP domain information corresponding to the default value configured in advance.

In a further aspect of the present disclosure, there provides a device for implementing interconnection between IP domains. The device is configured with IP domain information of adjacent IP domains that the device relates to, and creates a media stream according to IP domain information when receiving a message which indicates creating the corresponding media stream and the IP domain information of the IP domain that the media stream to be created pertains to.

In yet another aspect of the present disclosure, there provides a device for implementing interconnection between IP domains. The device is configured with IP domain information of adjacent IP domains that an MG, which correlates with the device and is between the IP domains, relates to, and sends the IP domain information of the IP domain, to which a media stream to be created pertains, to the MG.

The implementation of the present disclosure enables the MG between the IP domains in NGN, between which interconnecting is needed, to obtain the IP domain information of the IP domain to which the media stream to be created by the MG pertains, thus ensuring the interconnection between the IP domains which need to interconnect with each other, and providing great convenience for network operation.

DETAILED DESCRIPTION OF THE EMBODIMENTS

Figure 1:
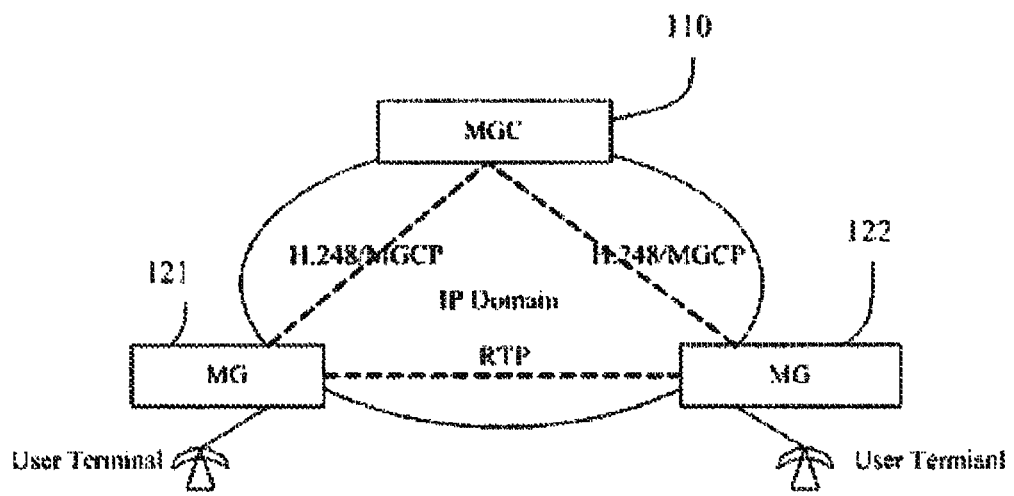
FIG. 1 is a schematic diagram illustrating the network structure of MG and MGC in NGN.
Figure 2:
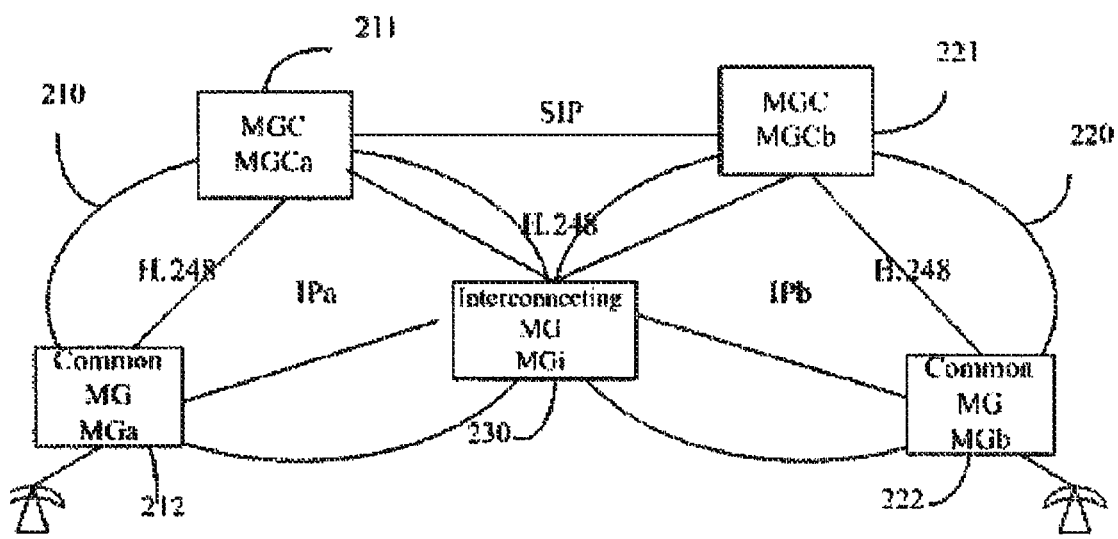
FIG. 2 is a schematic diagram illustrating the network structure for interconnection between IP domains in NGN.

FIG. 2 shows a schematic diagram illustrating the network structure of interconnecting MG between IP domains in NGN, wherein MGi 230 is arranged between IP domain IPa 210 and IP domain IPb 220 between which interconnection is desired. There are MGCa 211 and MGa 212 arranged in IPa 210, and MGCb 221 and MGb 222 arranged in IPb 220. MG (MGi) 230 arranged between the IP domains between which interconnection is desired is called interconnecting MG across IP domains or IP-IP MG (MG between the IP domains), which differs from common MGs (MGa 212 and MGb 222) in that: common MGs play the role of User Network Interface (UNI), while the IP-IP MG plays the role of Network Network Interface (NNI). Accordingly, the media streams on the IP-IP MG are transferred between the corresponding ephemeral Terminations.

To realize the interconnecting of media streams across different IP domains, when creating a media stream, the IP-IP MG needs to learn the IP domain information of the IP domain that the media stream pertains to. Since there are generally different requirements on media streams in different IP domains, for example, different protocols (such as IPv4 and IPv6) are adopted in different IP domains, the IP-IP MG can create a media stream correctly only after learning the corresponding IP domain information. The key idea of the present disclosure is to carry the IP domain information required by the IP-IP MG through extended LocalControl Descriptor of H.248 protocol, so as to make it convenient for the IP-IP MG to obtain the IP domain information for creating media streams and to create the corresponding media streams accurately.

The present disclosure will be further understood from the following detailed description of the method of an embodiment of the present disclosure with reference to accompanying drawings.

Figure 3:
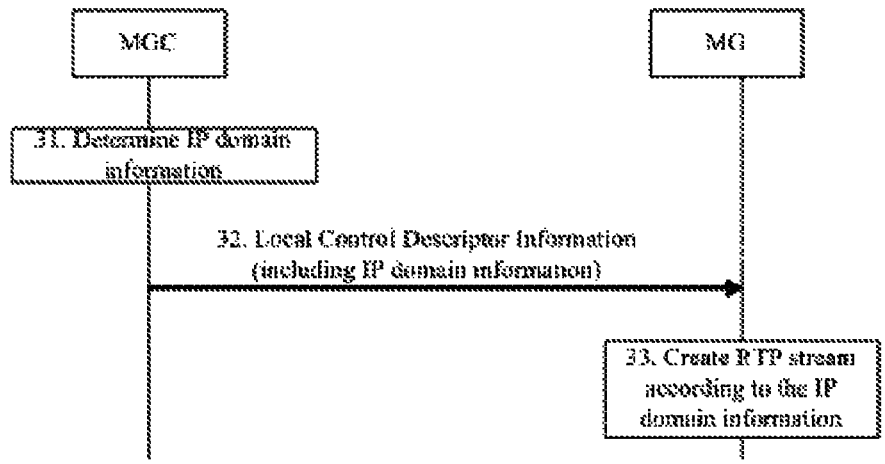
FIG. 3 is a flow chart illustrating the method according to an embodiment of the present disclosure.

As shown in FIG. 3, the method of an embodiment of the present disclosure specifically includes the following procedure:

Step 31: when an MGC determines to send an indication of creating a media stream to an MG, it determines the IP domain information of the IP domain that the media stream to be created pertains to;

The media stream may be a RTP media stream or any of other media streams.

In general, the MGC establishes a call connection for the purpose of creating a media stream between MGs; at that time, it is necessary to send an indication of creating a media stream to the MG by the MGC.

Corresponding IP domain information (such as IP domain identifiers, etc.) for different IP domains is configured on the MGC and the MG; and the IP domain information configured on the MGC is the same as that configured on the MG. When the MGC determines to send an indication of creating a media stream to the MG, it can obtain the IP domain information of the IP domain that the media stream to be created pertains to according to the configured information.

Step 32: The MGC transmits the IP domain information to the corresponding MG, informing the MG the IP domain to which the media stream to be created pertains;

The MGC can send the IP domain information to the MG with the IP domain information carried in the LocalControl Descriptor, and more specifically, the MGC can send the IP domain information to the MG with the IP domain information carried in an extended Property in the LocalControl Descriptor. The extended Property can be defined directly in the LocalControl Descriptor or defined through an extended Package and Properties of the extended Package.

Those skilled in the art should understand that the LocalControl Descriptor is a parameter of correlative messages relating to manipulating of the media stream; the correlative messages relating to manipulating of the media stream include but are not limited to messages such as Add, Modify, Move and the like.

Hereunder the LocalControl Descriptor mentioned above will be explained: when indicating the MG to add a Termination into a Context to create a media stream, the MGC generally describes the Properties of the Termination to be added in Descriptors such as LocalControl, Local, Remote and on the like; wherein the Local Descriptor describes encoding/decoding parameters of Local received (i.e., Remote sent) media streams; the Remote Descriptor describes encoding/decoding parameters of Remote received (i.e., Local sent) media streams, such as IP address and port, encoding/decoding algorithm and packaging duration, etc.; which parameters are organized in SDP (Session Description Protocol); the LocalControl Descriptor includes Mode, ReserveGroup and ReserveValue, and other Properties correlative with the media stream defined in the Package; wherein Mode describes the status of the media stream on the Termination with respect to the exterior of the Context, which can be send-only, receive-only, send-receive, inactive and loop-back; ReserveGroup and ReserveValue describe whether the resource for media stream encoding/decoding on the Termination shall be reserved; accordingly, in an embodiment of the present disclosure, a Property parameter of Realm (i.e., domain) can be extended into the LocalControl Descriptor of H.248 protocol for identifying the IP domain of the media stream carried by the Termination. The character string valued Property of IP domain information may be in the form of domain name, for example, "mynet.net".

Of course, a Property functioning as the same as Realm can be defined in a H.248 protocol package through extending a Package of H.248 protocol, for being used in bearing in the LocalControl Descriptor the corresponding IP domain information to be sent to the MG.

As described above, the IP domain information (IP domain identifiers) needs to be provisioned in advance between the MGC and the MG, and different IP domains between which interconnection may be needed should have different IP domain identifiers. Of course, the provisioning procedure can be implemented by a number of specific ways, as long as the MGC and the MG each can understand the meaning of the IP domain identifiers, and the detailed description of which will be omitted here.

Step 33: after obtaining the IP domain information of the IP domain, to which the media stream to be created pertains, sent by the MGC, the MG creates the corresponding media stream according to the IP domain information.

Those skilled in the art should understand that the creating the corresponding media stream according to the IP domain information includes: determining source address, source port, destination address, destination port, and protocol type, etc. of the media stream to be created according to the IP domain information, and the detailed description of which will be omitted here.

After the corresponding media stream is created, the interconnection between the IP domains in NGN is realized.

Those skilled in the art should understand that when media streams from the MG to different IP domains are created successfully and connected in series through the MG, the interconnection between those IP domains is realized. The procedure of connecting media streams in series includes forwarding and necessary modification of the media streams, etc., and the detail description of which will be omitted here.

It should be noted that if the IP domain information sent by the MGC cannot be identified by the MG (for example, which exceeds the range previously provisioned between the MGC and the MG), the MG fails to create the media stream and return the corresponding error code to the MGC. Moreover, in case of a successful creating, the MG may return a response of success to the MGC.

Moreover, a relative default IP domain information also can be configured on the IP-IP MG in advance (the default IP domain information may do not differ from the common IP domain information); and if the Property of IP domain information is in default in the indication of creating media stream sent by the MGC, the MG operates with respect to the default IP domain.

In case of single IP, the IP domain to which the MG pertains can be directly took as the default.

Figure 4:
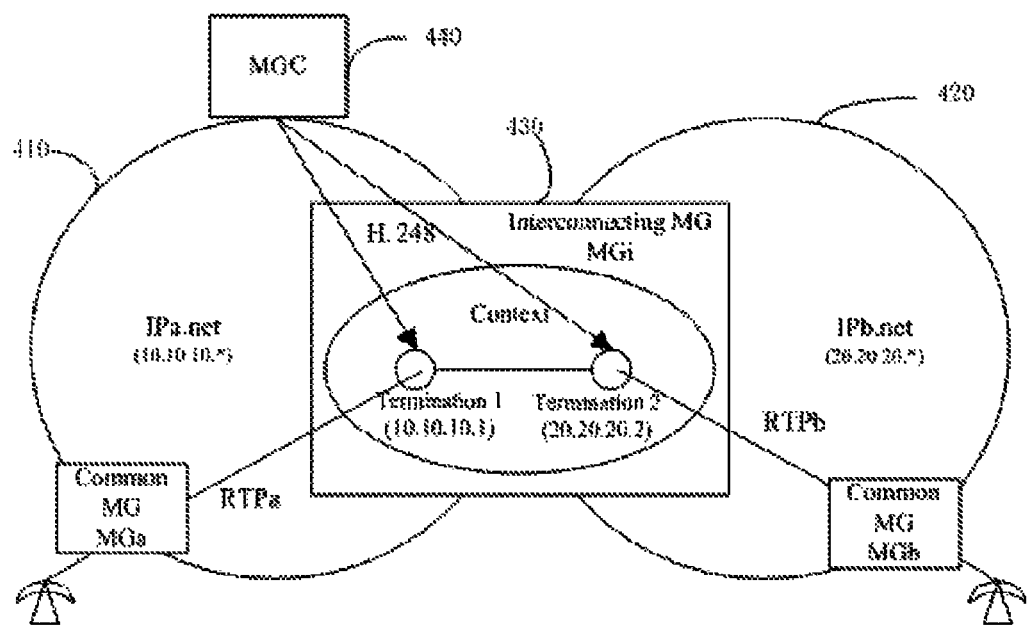
FIG. 4 is schematic diagram illustrating the procedure of creating a media stream according to an embodiment of the present disclosure.

FIG. 4 shows the method in practice use of creating RTP media streams according to an embodiment of the present disclosure. Two media streams are to be created by the interconnecting MG MGi 430 in FIG. 4, i.e., RTPa and RTPb. When MGC 440 indicates MGi 430 to create RTPa, it sends a LocalControl Descriptor with Realm=IPa.net (i.e., the IP domain information) to MGi 430. In this way, MGi 430 can learn the IP domain that the stream RTPa to be created pertains to is IPa.net, and then create the RTPa;

Those skilled in the art should understand that the MGC may be MGCa or MGCb, depending on by which MGC the MGi 430 is controlled. For example, the MGi is controlled subsequently by the MGC with which the MGi is registered.

In a similar way, RTPb can be created accordingly.

When a Context is established on MGi to interconnect Termination 1 with Termination 2 and the media streams RTPa and RTPb are created successfully, the interconnection between IP domains IPa 410 and IPb 420 is realized through MGi 430.

Referring to FIG. 2 again, in the system for implementing interconnection between IP domains of an embodiment of the present disclosure, MGi 230, MGCa 211 and MGCb 221 are configured with corresponding IP domain information respectively. When a media stream is to be created by MGi 230, the required IP domain information is sent by MGCa 211 or MGCb 221 to MGi 230; and then MGi 230 creates the media stream according to the IP domain information.

In a word, the embodiments of the present disclosure realize the interconnection between the IP domains in NGN between which interconnection is needed, thus to provide great convenience for network operation.

What mentioned above are just preferable embodiments of the present disclosure, which are not intended to limit the protection scope of the present disclosure. It is apparent that various modifications and substitutions in light thereof will be suggested to those skilled in the art easily and are to be included within the scope of the present disclosure defined by the appended claims.

What is claimed is:

1. A method for cross-domain communications, the method comprising:
   sending, by a Media Gateway Controller (MGC), domain information of a first Internet Protocol (IP) domain network and domain information of a second IP domain network, wherein the domain information of the first IP domain network and the domain information of the second IP domain network is each carried in a LocalControl Descriptor contained in a message from the MGC;
   receiving, by an interconnecting Media Gateway (MG) positioned to connect the first IP domain network and the second IP domain network, domain information of the first IP domain network and domain information of the second IP domain network from the MGC;
   creating, by the MG, a first media stream between the interconnecting MG and a first MG located in the first IP domain network according to the domain information of the first IP domain network;
   creating, by the MG, a second media stream between the interconnecting MG and a second MG located in the second IP domain network according to the domain information of the second IP domain network; and
   connecting, by the MG, the first media stream and the second media stream to form a data communication path between the first MG and the second MG.

2. The method of claim 1, wherein the domain information of the first IP domain network and the domain information of the second IP domain network are received from the MGC on the first IP domain network.

3. The method of claim 1, wherein the domain information of the first IP domain network and the domain information of the second IP domain network are received from the MGC on the second IP domain network.

4. The method of claim 1, wherein each of the domain information of the first IP domain network and the domain information of the second IP domain network is contained in a property of the LocalControl Descriptor.

5. The method of claim 1, wherein each of the domain information of the first IP domain network and the domain information of the second IP domain network is represented as a character string.

6. A system for implementing interconnection between Internet Protocol (IP) domains, the system comprising:
   a Media Gateway Controller (MGC) configured to send domain information of a first IP domain network and domain information of a second IP domain network, wherein the domain information of the first IP domain network and the domain information of the second IP domain network is each carried in a LocalControl Descriptor contained in a message from the MGC; and
   an interconnecting Media Gateway (MG) positioned to connect the first IP domain network and the second IP domain network and configured to:
      receive domain information of the first IP domain network and domain information of the second IP domain network from the MGC;
      create a first media stream between the interconnecting MG and a first MG located in the first IP domain network according to the domain information of the first IP domain network;
      create a second media stream between the interconnecting MG and a second MG located in the second IP domain network according to the domain information of the second IP domain network; and
      connect the first media stream and the second media stream to form a data communication path between the first MG and the second MG.

7. The system of claim 6, wherein the interconnecting MG is configured to receive the domain information of the first IP domain network and the domain information of the second IP domain network from the MGC on the first IP domain network.

8. The system of claim 6, wherein the interconnecting MG is configured to receive the domain information of the first IP domain network and the domain information of the second IP domain network from the MGC on the second IP domain network.

9. The system of claim 6, wherein each of the domain information of the first IP domain network and the domain information of the second IP domain network is contained in a property of the LocalControl Descriptor.

10. The system of claim 6, wherein each of the domain information of the first IP domain network and the domain information of the second IP domain network is represented as a character string.

* * * * *